(12) United States Patent
Namboodiri et al.

(10) Patent No.: US 9,247,243 B1
(45) Date of Patent: *Jan. 26, 2016

(54) INTERPOLATED VIDEO ERROR CONCEALMENT

(71) Applicant: Marvell International Ltd., Hamilton (BM)

(72) Inventors: Vipin Namboodiri, Bangalore (IN); Krishna Prasad Agara Venkatesha Rao, Bengaluru (IN)

(73) Assignee: Marvell International Ltd., Hamilton (BM)

( * ) Notice: Subject to any disclaimer, the term of this patent is extended or adjusted under 35 U.S.C. 154(b) by 562 days.

This patent is subject to a terminal disclaimer.

(21) Appl. No.: 13/722,614

(22) Filed: Dec. 20, 2012

Related U.S. Application Data

(60) Provisional application No. 61/582,475, filed on Jan. 2, 2012.

(51) Int. Cl.
*H04N 7/12* (2006.01)
*H04N 11/02* (2006.01)
*H04N 11/04* (2006.01)
*G06F 15/173* (2006.01)
*H04N 19/132* (2014.01)

(52) U.S. Cl.
CPC ............................... *H04N 19/00127* (2013.01)

(58) Field of Classification Search
CPC .... H04N 7/014; H04N 7/0127; H04N 7/0135
USPC ...................................................... 375/240.01
See application file for complete search history.

(56) References Cited

U.S. PATENT DOCUMENTS

| 7,129,987 | B1 | 10/2006 | Westwater |
| 7,203,235 | B2 | 4/2007 | Huang et al. |
| 7,231,445 | B1 * | 6/2007 | Aweya et al. ................ 709/226 |
| 8,768,103 | B2 | 7/2014 | Ogino et al. |
| 2008/0231745 | A1 | 9/2008 | Ogino et al. |

* cited by examiner

*Primary Examiner* — Hee-Yong Kim

(57) ABSTRACT

Embodiments of the present disclosure provide a method that comprises receiving a first stream of video frames at a first frame rate and generating a second stream of video frames at a second frame rate. The method also comprises interpolating between a pair of adjacent video frames of the first stream of video frames to produce a first number of interpolated intermediate video frames in a particular sequence of the intermediate video frames. The method further comprises duplicating at least one of the adjacent video frames of the pair of adjacent video frames to produce a second number of duplicated intermediate video frames in the particular sequence of the intermediate video frames. The method further comprises, in response to a change in observed interpolation quality, dynamically changing the first number of interpolated intermediate video frames and the second number of duplicated intermediate video frames.

20 Claims, 4 Drawing Sheets

INTERPOLATED VIDEO ERROR CONCEALMENT

CROSS-REFERENCE TO RELATED APPLICATION

The present disclosure claims priority to U.S. Provisional Patent Application No. 61/582,475, filed on Jan. 2, 2012, which is incorporated herein by reference.

TECHNICAL FIELD

Embodiments of the present disclosure relate to the field of video frame interpolation, and more particularly to techniques, devices, and systems for mitigating errors in video frame interpolation.

BACKGROUND

Up-conversion of video streams uses frame interpolation to insert interpolated frames between original frames of a video stream. For example, up-converting a video stream from 24 frames per second (fps), as in conventional analog video, to 120 fps, as in high-definition television, is performed by inserting four intermediate frames between consecutive or temporally adjacent frames of the original video stream. In an aggressive interpolation, all four intermediate frames may be interpolated frames. In a defensive interpolation, only one or two of the intermediate frames may be interpolated frames, and the remaining intermediate frames are repeated or duplicated frames of the original video stream. If interpolation is turned off or not being used, then all intermediate frames are duplicated frames rather than interpolated frames.

In conventional video systems, users are provided with a setting, such as in a menu screen, to set the degree of interpolation. Aggressive interpolation is used to avoid judder, or the appearance of shaking that can occur when repeating frames. But aggressive interpolation may result in artifacts created by interpolation errors. Often, users of conventional video systems may select a mid-level or "medium" level of interpolation aggressiveness to avoid the worst interpolation artifacts, thus balancing interpolation quality with the appearance of judder.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one embodiment, the present disclosure provides a method that comprises receiving a first stream of video frames at a first frame rate and generating a second stream of video frames at a second frame rate. The second stream comprises (i) video frames of the first stream of video frames and (ii) sequences of intermediate video frames inserted between video frames of the first stream of video frames. The method also comprises interpolating between a pair of adjacent video frames of the first stream of video frames to produce a first number of interpolated intermediate video frames in a particular sequence of the intermediate video frames. The method further comprises duplicating at least one of the adjacent video frames of the pair of adjacent video frames to produce a second number of duplicated intermediate video frames in the particular sequence of the intermediate video frames. The method further comprises, in response to a change in observed interpolation quality, dynamically changing the first number of interpolated intermediate video frames and the second number of duplicated intermediate video frames in the second stream of video frames.

In another embodiment, the present disclosure provides one or more computer-readable storage media storing instructions that are executable to perform actions that comprise receiving a first stream of video frames at a first frame rate and generating a second stream of video frames at a second frame rate. The second stream comprises (i) video frames of the first stream of video frames and (ii) sequences of intermediate video frames inserted between video frames of the first stream of video frames. The actions further comprise interpolating between a pair of adjacent video frames of the first stream of video frames to produce a first number of interpolated intermediate video frames in a particular sequence of the intermediate video frames. The actions further comprise duplicating at least one of the adjacent video frames of the pair to produce a second number of duplicated intermediate video frames in the particular sequence of the intermediate video frames. The actions further comprise, in response to a change in observed interpolation quality, dynamically changing the first number of interpolated intermediate video frames and the second number of duplicated intermediate video frames in the second stream of video frames.

In another embodiment, the present disclosure provides a video system comprising a conversion engine that is configured to (i) receive a first stream of video frames at a first frame rate, and (ii) generate a second stream of video frames at a second frame rate, wherein the second stream of video frames comprises (i) video frames of the first stream of video frames and (ii) sequences of intermediate video frames inserted between video frames of the first stream of video frames. The conversion engine is further configured to interpolate between a pair of adjacent video frames of the first stream of video frames to produce a first number of interpolated intermediate video frames in a particular sequence of the intermediate video frames. The conversion engine is also configured to duplicate at least one of the adjacent video frames of the pair of adjacent video frames to produce a second number of duplicated intermediate video frames in the particular sequence of the intermediate video frames. In response to a change in observed interpolation quality, the conversion engine is configured to dynamically change the first number of interpolated intermediate video frames and the second number of duplicated intermediate video frames in the second stream of video frames.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

DETAILED DESCRIPTION OF EMBODIMENTS OF THE DISCLOSURE

Video systems according to the present disclosure use interpolation to perform frame rate up-conversion. The degree of interpolation is dynamically varied in response to observed quality of the interpolation. When interpolation quality is observed to be relatively high, an aggressive mode of interpolation is selected, wherein most or all of the intermediate frames of an up-converted video stream are interpolated frames. When interpolation quality is observed to be relatively low, a less aggressive mode of interpolation is selected, in which relatively more of the intermediate frames are duplicated frames rather than interpolated frames. The interpolation quality is monitored during operation, and the ratio of interpolated frames to duplicated frames is varied dynamically during operation in response to the monitored interpolation quality.

Figure 1:
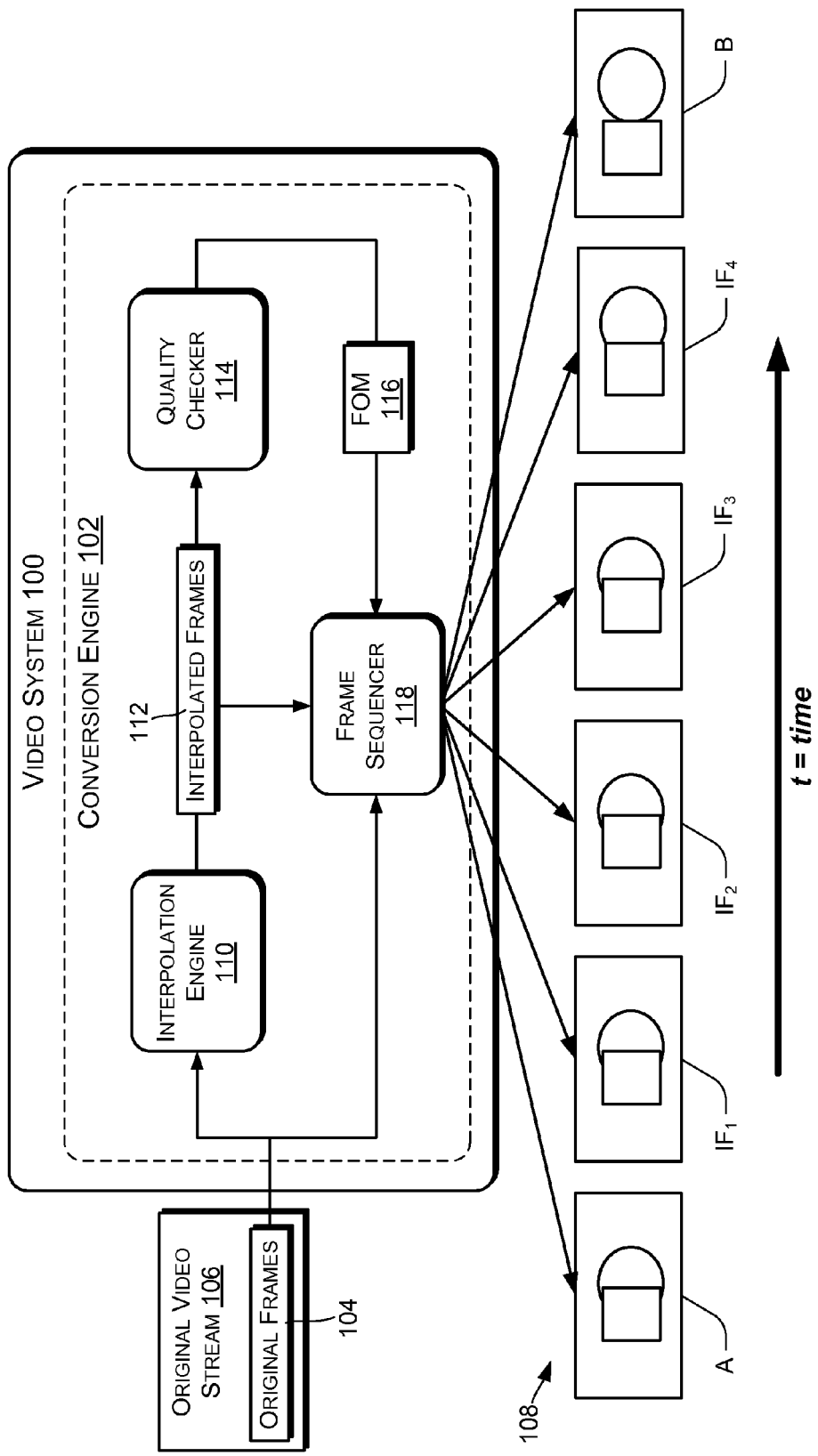
FIG. 1 is a schematic diagram of an example video system that performs frame rate up-conversion.
Figure 5:
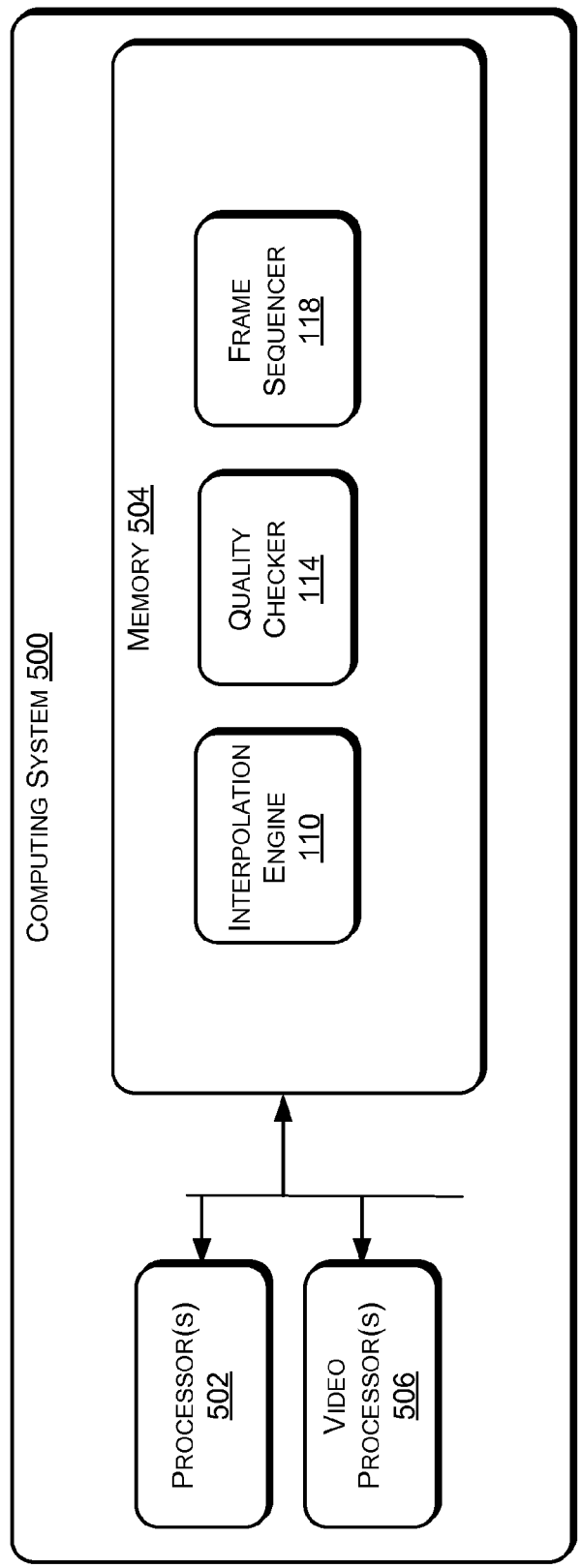
FIG. 5 is an example computing system usable to implement a software-based video system according to embodiments.

FIG. 1 is a schematic diagram of an example video system 100 for dynamically varying the composition of an up-converted video stream based on an interpolation performance metric that is generated in real time based on observed quality of interpolation. One or more aspects of the video system illustrated in FIG. 1 may be implemented in hardware or a combination of hardware and software. The video system 100 may be implemented within a video card, as part of a system on a chip, as a series of discrete hardware components, as one or more application specific integrated circuits (ASICs), as one or more field programmable gate arrays (FPGAs), or other hardware-based solutions. One or more components of the video system 100 may be software-based, such as may be stored in firmware in read-only memory (ROM) or flash memory, and configured to be executable by one or more processors. A software-implemented video system is illustrated in FIG. 5.

The video system 100 includes a conversion engine 102 that receives a plurality of frames 104 from an original video stream 106 having a first frame rate. The conversion engine 102 is configured to perform frame rate up-conversion, to produce an up-converted video stream 108 having a second frame rate that is higher than the first frame rate of the original video stream 106. For example, the first frame rate might be 24 frames per second (fps), and the second frame rate might be 120 fps.

In the example shown in FIG. 1, frames A and B of the up-converted video stream 108 are adjacent frames of the original video stream 106, with frame A coming just before frame B in the original video stream 106. In this example, four intermediate frames $IF_1$, $IF_2$, $IF_3$, and $IF_4$ (referred to collectively as $IF_x$) are inserted between the original frames A and B of the original video stream 106. As will be described in more detail below, each of the intermediate frames $IF_x$ may comprise an interpolated frame or a duplicate frame, depending on the currently observed quality of interpolation produced by the conversion engine 102.

The conversion engine 102 comprises a frame interpolator or interpolation engine 110 that is responsive to the original frames 104 to generate one or more interpolated frames 112. The interpolation engine 110 may use various techniques for generating the interpolated frames 112, including motion estimation schemes and bi-directional motion estimation schemes.

The conversion engine 102 further comprises an interpolation quality checker 114, which evaluates the interpolated frames 112 as they are produced to determine the real-time quality of the interpolated frames 112 generated by the interpolation engine 110. The interpolation quality is quantified as a figure of merit (FOM) 116.

Real-time interpolation quality may be based on a number of factors. For example, the FOM 116 may be determined based on evaluated interpolation errors and/or the accuracy of one or more occlusion or reveal regions of the one or more interpolated frames 112. For examples of evaluating interpolation quality based on observations of interpolated frames, refer to U.S. patent application Ser. No. 13/658,662, filed on Oct. 23, 2012, which is incorporated herein by reference.

The conversion engine 102 further comprises a frame sequencer 118, which is responsive to the FOM 116 to generate the up-converted video stream 108 based on the original frames 104 and the interpolated frames 112. Each of the intermediate frames $IF_x$ comprises either a duplicated one of the original frames A or B, or one of the interpolated frames 112. More specifically, the intermediate frames $IF_x$ comprise a first number X of interpolated frames 112 and a second number Y of duplicated frames, where X and Y are equal to or greater than zero, and X+Y equals the total number of intermediate frames, which in this example is equal to four.

When the FOM 116 is high, indicating high interpolation quality, all of the intermediate frames $IF_x$ may comprise interpolated frames: i.e., X may equal four and Y may equal zero. When the FOM 116 is low, indicating low interpolation quality, all of the intermediate frames $IF_x$ may comprise duplicated frames: i.e., X may equal zero and Y may equal four. At intermediate values of FOM 116, the intermediate frames $IF_x$ may include both duplicated and interpolated frames.

As an example, the FOM may be viewed as producing values ranging in meaning from "excellent" to "bad". In Table 1 below, the FOM 116 may be viewed as producing values corresponding to "excellent", "good", "fair", "poor", or "bad".

TABLE 1

| FOM | INTERMEDIATE FRAMES |
| --- | --- |
| Excellent | 0.2AB, 0.4AB, 0.6AB, 0.8AB |
| Good | 0.2AB, 0.4AB, 0.6AB, 0.8AB |
| Fair | A, 0.25AB, 0.50AB, 0.75AB |
| Poor | A, 0.33AB, 0.66AB, B |
| Bad | A, A, B, B |

Table 1 illustrates the nature of the intermediate frames IFx for each of the FOM values, in a situation in which the original frame rate is up-converted by a factor of five. Specifically, Table 1 shows, for each FOM value, a sequence of four intermediate frames. "A" indicates the first of a pair of adjacent original frames. "B" indicates the second or last of the pair of adjacent original frames. 0.xAB indicates an interpolated frame, which is generated based on the projected positions of objects in A and/or B at an intermediate time 0.x relative to the original frames A and B. For example, 0.2AB is generated from frames A and/or B based on the assumption that any movement of objects between frames A and B is at 20% of its final value.

When the FOM 116 is "excellent" or "good", the intermediate frames $IF_x$ comprise interpolated frames demonstrating 20%, 40%, 60%, and 80%, respectively, of the total motion between original frames A and B. When the FOM 116 is "fair", one of the intermediate frames $IF_1$ may comprise a duplicated frame A, followed by interpolated frames demonstrating 25%, 50%, and 75%, respectively, of the total motion between original frames A and B. When the ROM 116 is "poor", the initial intermediate frame $IF_1$ may comprise a duplicated frame A, followed by interpolated frames demonstrating 33% and 66% of the total motion between original frames A and B, followed by a duplicated frame B. When the FOM 116 is "bad", the intermediate frames may comprise two duplicated frames A, followed by two duplicated frames B.

In the example illustrated by Table 1, the interpolated intermediate frames are calculated based on proportional temporal spacings of the interpolated intermediate frames relative to the adjacent frames A and B, based on the number of interpolated frames used in any particular sequence. Thus, a frame i of a total of X interpolated frames (where i ranges from 1 to X), is calculated based on a distance i/X from the first original frame A.

Table 2 illustrates another example of calculating intermediate frames, in which an original frame rate is up-converted by a factor of four. In this example, three intermediate frames are inserted between each set of adjacent original frames.

TABLE 2

| FOM | INTERMEDIATE FRAMES |
|---|---|
| Excellent | 0.25AB, 0.50AB, 0.75AB |
| Good | 0.25AB, 0.50AB, 0.75AB |
| Fair | A, 0.33AB, 0.66AB |
| Poor | A, 0.5AB, B |
| Bad | A, A, B |

Figure 2:
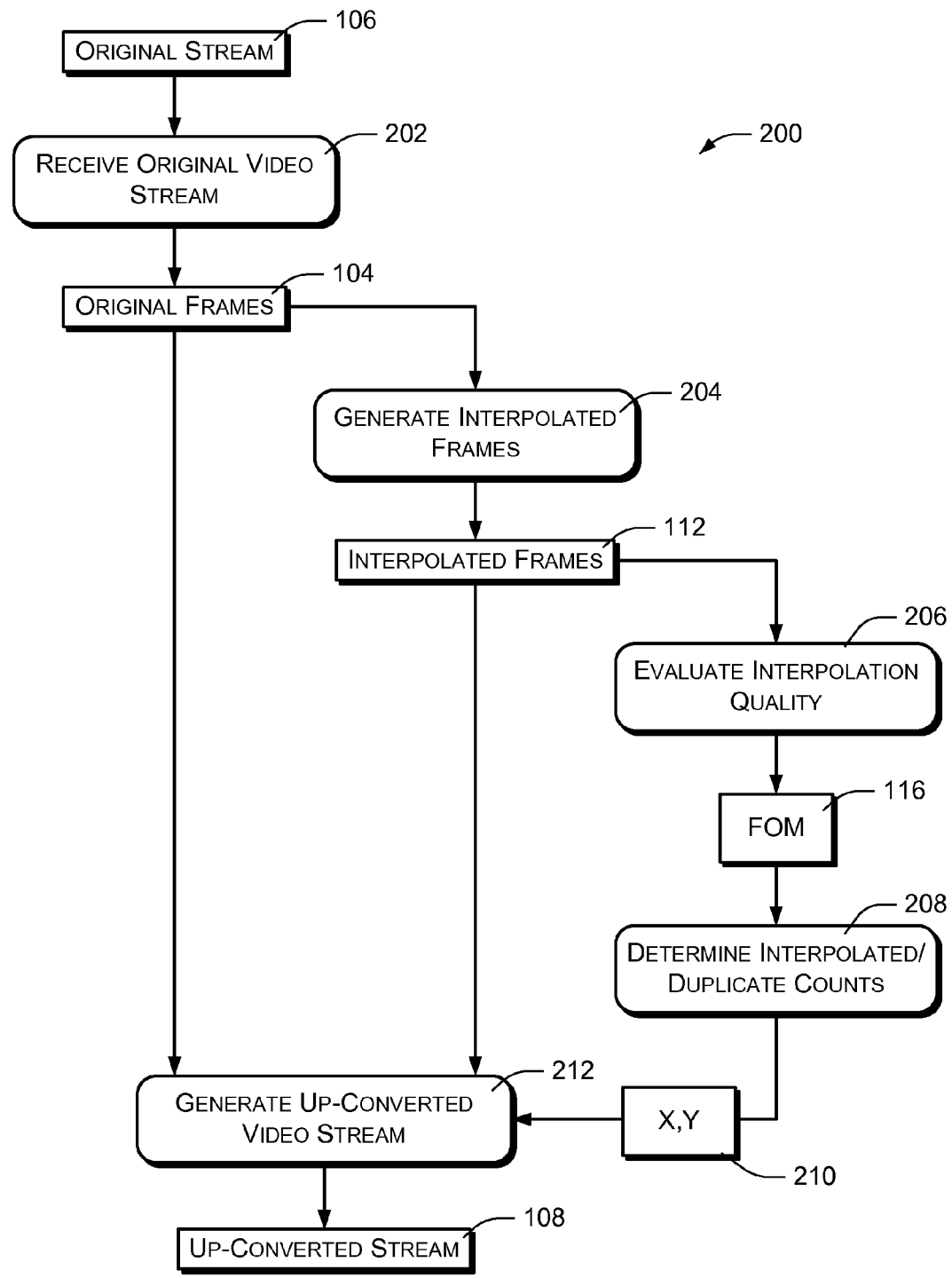
FIG. 2 is a flowchart showing an example process of dynamically varying the number of interpolated frames in an up-converted video stream based on an observed interpolation quality.

FIG. 2 illustrates an example method 200 of up-converting a video stream while mitigating the visual impact of interpolation errors. The example method 200 is discussed below with reference to the environment of FIG. 1, although the method 200 may also be implemented in other environments.

An action 202 comprises receiving the original video stream 106, which comprises a sequence of original video frames 104. An action 204 comprises generating interpolated frames 112 based on the original frames 104. In some embodiments, the action 204 may comprise generating a number of interpolated frames 112 that is equal to the number of intermediate frames that are to be inserted to create the up-converted video stream. For example, when performing 24 fps to 120 fps up-conversion, four frames are inserted between each adjacent pair of original frames and the action 204 therefore generates four interpolated frames 112 for each original frame 104.

An action 206 comprises evaluating interpolation quality demonstrated by the interpolated frames 112, and producing the interpolation quality indicator or FOM 116.

An action 208 comprises determining interpolated and duplicate frame counts 210 based on the FOM 116. The interpolated and duplicate frame counts 210 indicate the number X of interpolated frames and the number Y of duplicate frames that are to be used in the up-converted video stream 108.

An action 212 comprises generating the up-converted video stream 108 based on the frame counts 210, using the number of interpolated frames 112 and original frames 104 indicated by the interpolated and duplicate frame counts 210.

Figure 3:
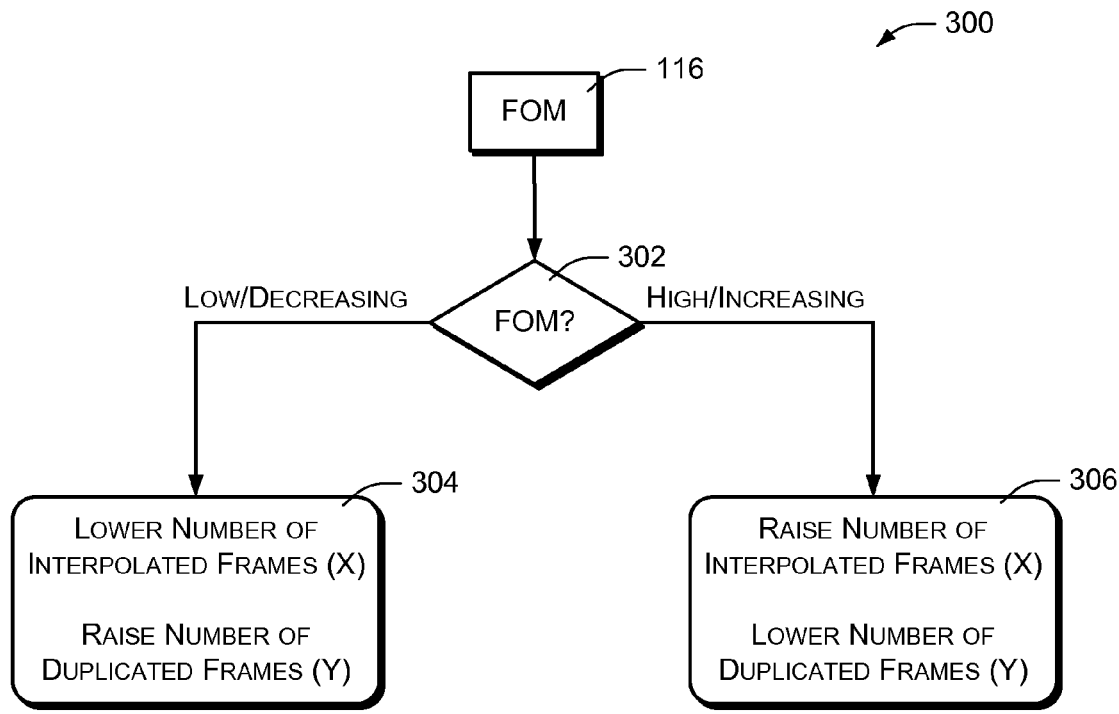
FIG. 3 is a flowchart showing an example process of varying the relationship between interpolated and duplicated frames in response to an observed interpolation quality.

FIG. 3 illustrates an example method 300 for performing the action 208 of calculating or determining the frame counts 210, which may comprise dynamically changing a ratio of the first number to the second number in response to a change in observed interpolation quality.

An action 302 comprises determining whether the FOM 116 is relatively high and/or increasing, or whether the FOM 116 is relatively low or decreasing. If the FOM 116 is relatively low or is decreasing, an action 304 is performed, comprising decreasing the ratio of interpolated frames to duplicated frames, which may comprise lowering the number of interpolated frames X and/or increasing the number of duplicated frames Y. If the FOM 116 is relatively high or increasing, an action 306 is performed, comprising increasing the ratio of interpolated frames to duplicated frames, which may in turn comprise increasing the number of interpolated frames X and/or lowering the number of duplicated frames Y. In certain embodiments, the frame counts X and Y may be set in a manner that implements an interpolation scheme such as indicated by Table 1 or Table 2.

In some situations, an unfiltered FOM may cause interpolation ratios to oscillate rapidly, creating switching artifacts that are noticeable to viewers. Similarly, an unfiltered FOM may jump drastically from time to time, resulting in large and abrupt changes in interpolation ratios. Such large and abrupt changes may disrupt the viewing experience.

Figure 4:
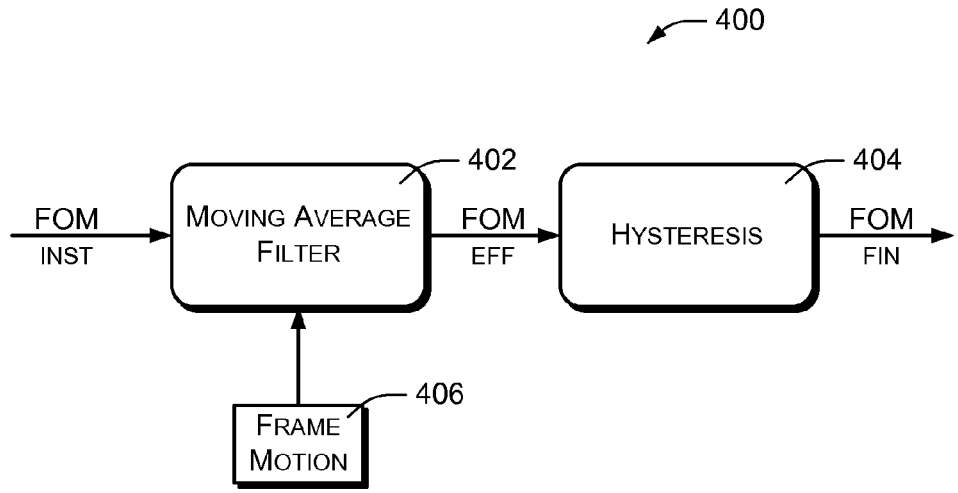
FIG. 4 is a flowchart showing an example of temporally filtering an interpolation figure of merit.

FIG. 4 describes a process 400 that applies a moving average filter and a hysteresis filter to the FOM 116 to help resolve these potential problems. Note that the filtering described below assumes a video sequence that does not contain a change in scene (referred to as a "scene cut"). Filtering states are reset on scene cuts.

In this example, the FOM is initially produced for each interpolated frame 112 generated by the interpolation engine 110. This value is referred to in FIG. 4 as an instantaneous value, or $FOM_{INST}$. The $FOM_{INST}$ is received and processed by a moving average filter 402, which averages $FOM_{INST}$ over a number of values to produce an effective FOM, referred to in FIG. 4 as $FOM_{EFF}$. As an example, $FOM_{EFF}$ may comprise a moving average of the eight most recent values of $FOM_{INST}$. Note that the moving average is reset on a scene cut.

Generally, $FOM_{EFF}$ is defined to fall within one of the following levels (on the basis of estimated picture quality): Excellent, Good, Fair, Bad, and Poor. More specifically, the moving average filter 402 may maintain a scalar value referred to as $FOM_{SCALAR}$, which varies from 0 to 100. The following table represents a state mapping to $FOM_{SCALAR}$:

TABLE 3

| FOM | Bounds for $FOM_{SCALAR}$ |
|---|---|
| Excellent | 81-100 |
| Good | 61-80 |
| Fair | 41-60 |
| Poor | 21-40 |
| Bad | 0-20 |

In some cases, $OM_{SCALAR}$ may vary around a state boundary. For example, consider the situation in which consecutive frames produce $FOM_{SCALAR}$ values of 58, 62, 58, 62, .... This would result in interpolation ratios corresponding consecutively to Good, Fair, Good, Fair, ..., and would potentially create noticeable switching artifacts.

Such switching artifacts are avoided by using a hysteresis filter 404, which produces a final FOM value, referred to in FIG. 4 as $FOM_{FIN}$, corresponding to each of the interpolated frames. The hysteresis filter 404 is configured to reduce jitter and excessive oscillations in the FOM.

The design of the hysteresis filter is such the states have different entry and exit criteria relative to the scalar value, as represented in the following table:

TABLE 4

| FOM | Values of $FOM_{SCALAR}$ that determine entry to this state from a lower state | Values of $FOM_{SCALAR}$ that determine exit from this state to a lower state |
| --- | --- | --- |
| Excellent | 85 | 75 |
| Good | 65 | 55 |
| Fair | 45 | 35 |
| Poor | 25 | 15 |
| Bad | — | — |

For the example discussed above, where the value of $FOM_{SCALAR}$ across consecutive frames was 58, 62, 58, 62, . . . , the resulting interpolation state will remain at Good if the initial state was Good, and would remain at Fair if the initial state was Fair. This scheme effectively eliminates a potential switching artifact for both cases (independent of the initial state).

The moving average filter 402 may in some embodiments be responsive to an evaluation of the frame motion 406. In situations of relatively low inter-frame motion, interpolation may be performed less aggressively (implies higher Error Concealment). In situations of relatively high inter-frame motion, interpolation may be performed more aggressively, and a fewer number of duplicated frames may be used. Further, if overall motion is low, relatively aggressive error concealment strategies may be dmpliyed, such as allowing for dramatic changes in output interpolation state from Excellent to Poor (which is not normally allowed when the motion is high).

In the environment of FIG. 1, the FOM 116 may comprise $FOM_{FIN}$.

FIG. 5 illustrates an exemplary computing system 500 that is usable to implement a video system in accordance with various embodiments. The computing system 500 may be configured as any suitable computing device capable of implementing a video system. According to various non-limiting examples, suitable computing devices may include personal computers (PCs), servers, server farms, datacenters, tablet computers, smartphones, personal data assistants, game consoles, combinations of these, or any other computing device(s) capable of storing and executing all or part of a video service.

In one example configuration, the computing system 500 comprises one or more processors 502 and memory 504. The memory 504 may store program instructions that are loadable and executable on the processor(s) 502, as well as data generated during execution of, and/or usable in conjunction with, these programs. In the illustrated example, the memory 504 includes the interpolation engine 110. Some or all of the interpolation functions of the interpolation engine 110 may be performed by one or more video processor(s) 506.

The memory 504 also includes the interpolation quality checker 114 and an the frame sequencer 118, which are configured to perform as described above.

Depending on the configuration and type of computing system used, the memory 504 may include volatile memory (such as random access memory (RAM)) and/or non-volatile memory (such as read-only memory (ROM), flash memory, etc.). The memory 404 may also include additional removable storage and/or non-removable storage including, but not limited to, flash memory, magnetic storage, optical storage, and/or tape storage that may provide non-volatile storage of computer readable instructions, data structures, program modules, and other data.

The memory 504 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Furthermore, although FIGS. 1 and 5 assign functional responsibilities to discrete logical elements or components for purposes of discussion, the described functionality may be implemented in various different ways, using various different programmatic and/or logical architectures and configurations, including the use of different functional elements.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:
1. A method comprising:
   receiving a first stream of video frames at a first frame rate;
   generating a second stream of video frames at a second frame rate, wherein the second stream comprises (i) video frames of the first stream of video frames and (ii)

sequences of intermediate video frames inserted between video frames of the first stream of video frames;

interpolating between a pair of adjacent video frames of the first stream of video frames to produce a first number of interpolated intermediate video frames in a particular sequence of the intermediate video frames;

duplicating at least one of the adjacent video frames of the pair of adjacent video frames to produce a second number of duplicated intermediate video frames in the particular sequence of the intermediate video frames;

receiving a plurality of interpolation quality values corresponding to one or more interpolated intermediate video frames;

temporally filtering the plurality of interpolation quality values to obtain observed interpolation quality; and in response to a change in the observed interpolation quality, dynamically changing the first number of interpolated intermediate video frames and the second number of duplicated intermediate video frames in the second stream of video frames.

2. The method of claim 1, wherein dynamically changing the first number of interpolated intermediate video frames and the second number of duplicated intermediate video frames comprises changing a ratio of the first number of interpolated intermediate video frames to the second number of duplicated intermediate video frames.

3. The method of claim 1, further comprising:
in response to an increase in the observed interpolation quality, increasing the ratio of the first number of interpolated intermediate video frames to the second number of interpolated duplicated video frames; and
in response to a decrease in the observed interpolation quality, decreasing the ratio of the first number of interpolated intermediate video frames to the second number of duplicated intermediate video frames.

4. The method of claim 1, wherein (i) the first number of interpolated intermediate video frames and (ii) the second number of duplicated intermediate video frames are greater than or equal to zero.

5. The method of claim 1, wherein the interpolated intermediate video frames are calculated based on proportional temporal spacings of the interpolated intermediate video frames relative to the adjacent video frames of the pair of adjacent video frames.

6. The method of claim 1, wherein temporally filtering comprises averaging a plurality of most recently received interpolation quality values.

7. The method of claim 1, wherein temporally filtering comprises hysteretic filtering.

8. One or more computer-readable storage media storing a plurality of instructions executable by one or more processors of a computing system to cause the computing system to perform actions comprising:

receiving a first stream of video frames at a first frame rate;

generating a second stream of video frames at a second frame rate, wherein the second stream comprises (i) video frames of the first stream of video frames and (ii) sequences of intermediate video frames inserted between video frames of the first stream of video frames;

interpolating between a pair of adjacent video frames of the first stream of video frames to produce a first number of interpolated intermediate video frames in a particular sequence of the intermediate video frames;

duplicating at least one of the adjacent video frames of the pair to produce a second number of duplicated intermediate video frames in the particular sequence of the intermediate video frames;

receiving a plurality of interpolation quality values corresponding to one or more interpolated intermediate video frames;

temporally filtering the plurality of interpolation quality values to obtain observed interpolation quality; and in response to a change in observed interpolation quality, dynamically changing the first number of interpolated intermediate video frames and the second number of duplicated intermediate video frames in the second stream of video frames.

9. The one or more computer-readable storage media of claim 8, wherein dynamically changing the first number of interpolated intermediate video frames and the second number of duplicated intermediate video frames comprises changing a ratio of the first number of interpolated intermediate video frames to the second number of duplicated intermediate video frames.

10. The one or more computer-readable storage media of claim 8, wherein the actions further comprise:
in response to an increase in the observed interpolation quality, increasing the ratio of the first number of interpolated intermediate video frames to the second number of duplicated intermediate video frames; and
in response to a decrease in the observed interpolation quality, decreasing the ratio of the first number of interpolated intermediate video frames to the second number of duplicated intermediate video frames.

11. The one or more computer-readable storage media of claim 8, wherein the interpolated intermediate video frames are calculated based on proportional temporal spacings of the interpolated intermediate video frames relative to the adjacent video frames of the pair of adjacent video frames.

12. The one or more computer-readable storage media of claim 8, wherein the actions further comprise receiving interpolation quality values that indicate the observed interpolation quality.

13. The one or more computer-readable storage media of claim 8, wherein temporally filtering the interpolation quality values comprises averaging a plurality of most recently received interpolation quality values.

14. The one or more computer-readable storage media of claim 8, wherein temporally filtering the interpolation quality values comprises hysteretic filtering.

15. A video system, comprising:
a conversion engine configured to (i) receive a first stream of video frames at a first frame rate, and (ii) generate a second stream of video frames at a second frame rate, wherein the second stream of video frames comprises (i) video frames of the first stream of video frames and (ii) sequences of intermediate video frames inserted between video frames of the first stream of video frames;
wherein the conversion engine is further configured to:
interpolate between a pair of adjacent video frames of the first stream of video frames to produce a first number of interpolated intermediate video frames in a particular sequence of the intermediate video frames;
duplicate at least one of the adjacent video frames of the pair of adjacent video frames to produce a second number of duplicated intermediate video frames in the particular sequence of the intermediate video frames;
receive a plurality of interpolation quality values corresponding to the interpolated intermediate video frames;
temporally filter the interpolation quality values to obtain the observed interpolation quality; and
in response to a change in observed interpolation quality, dynamically change the first number of interpolated intermediate video frames and the second number of duplicated intermediate video frames in the second stream of video frames.

16. The video system of claim 15, wherein dynamically changing the first number of interpolated intermediate video frames and the second number of duplicated intermediate video frames comprises changing a ratio of the first number of interpolated intermediate video frames to the second number of duplicated intermediate video frames.

17. The video system of claim 15, the conversion engine being further configured to:
   in response to an increase in the observed interpolation quality, increase the ratio of the first number of interpolated intermediate video frames to the second number of duplicated intermediate video frames; and
   in response to a decrease in the observed interpolation quality, decrease the ratio of the first number of interpolated intermediate video frames to the second number of duplicated intermediate video frames.

18. The video system of claim 15, wherein the interpolated intermediate video frames are calculated based on proportional temporal spacings of the interpolated intermediate video frames relative to the adjacent video frames of the pair of adjacent video frames.

19. The video system of claim 15, wherein temporally filtering the interpolation quality values comprises averaging a plurality of most recently received interpolation quality values.

20. The video system of claim 15, wherein temporally filtering the interpolation quality values comprises hysteretic filtering.

* * * * *